United States Patent

Vowell

[11] Patent Number: 5,495,226
[45] Date of Patent: Feb. 27, 1996

[54] SECONDARY BRAKE LIGHT SWITCH

[76] Inventor: Dennis W. Vowell, 14516 W. David Dr., Hammond, La. 70401

[21] Appl. No.: 249,706

[22] Filed: May 26, 1994

[51] Int. Cl.$^6$ .................................................. B60Q 1/44
[52] U.S. Cl. .................. 340/479; 340/467; 200/61.89; 200/86.5; 307/108; 180/271; 123/359; 123/198 D
[58] Field of Search ................................ 340/429, 467; 200/61.89, 86.5; 307/108; 180/271; 123/359, 198 D

[56] References Cited

U.S. PATENT DOCUMENTS

| | | | |
|---|---|---|---|
| 3,372,372 | 3/1968 | Carpenter et al. | 340/467 |
| 3,548,124 | 12/1970 | Tollernd | 340/479 |
| 3,639,898 | 2/1972 | Booth | 340/467 |
| 3,676,844 | 7/1972 | Hendickson | 340/467 |
| 3,921,750 | 11/1975 | Shames | 340/467 |
| 3,939,316 | 2/1976 | Stropkay | 340/479 |
| 4,219,710 | 8/1980 | Booth | 340/467 |
| 4,959,634 | 9/1990 | Miller | 340/467 |
| 5,016,587 | 5/1991 | Berger et al. | 123/198 D |
| 5,023,599 | 6/1991 | Mitchell et al. | 340/467 |
| 5,172,095 | 12/1992 | Scott | 340/467 |
| 5,210,522 | 5/1993 | Hoekman et al. | 340/467 |

Primary Examiner—Brent A. Swarthout
Assistant Examiner—Nina Tong

[57] ABSTRACT

A secondary brake light switch comprising a hollow housing having a first end and a second end; an electrically conductive plunger slidably disposed within the housing; a switch coupled to the second end of the housing with switch having an input terminal facing the plunger and an output terminal adapted to be coupled between brake lights of a vehicle and their associated power source; a generally hollow vacuum valve having a first end coupled to first end of the housing, a second end adapted to be coupled to a vacuum system of a vehicle, and a diaphragm disposed within the vacuum valve with the diaphragm actuated when a high vacuum condition is created at the second end of the housing when a vehicle is accelerating and the diaphragm de-actuated when a low vacuum condition is created at the second end of the housing when a vehicle is idling; and an extension mechanism coupled between the diaphragm and the plunger for allowing the plunger to contact the input terminal of the switch when the diaphragm is de-actuated, whereby enabling brake lights to be energized, and allowing the plunger to break contact with the input terminal of the switch when the diaphragm is actuated, whereby enabling brake lights to be de-energized.

1 Claim, 4 Drawing Sheets

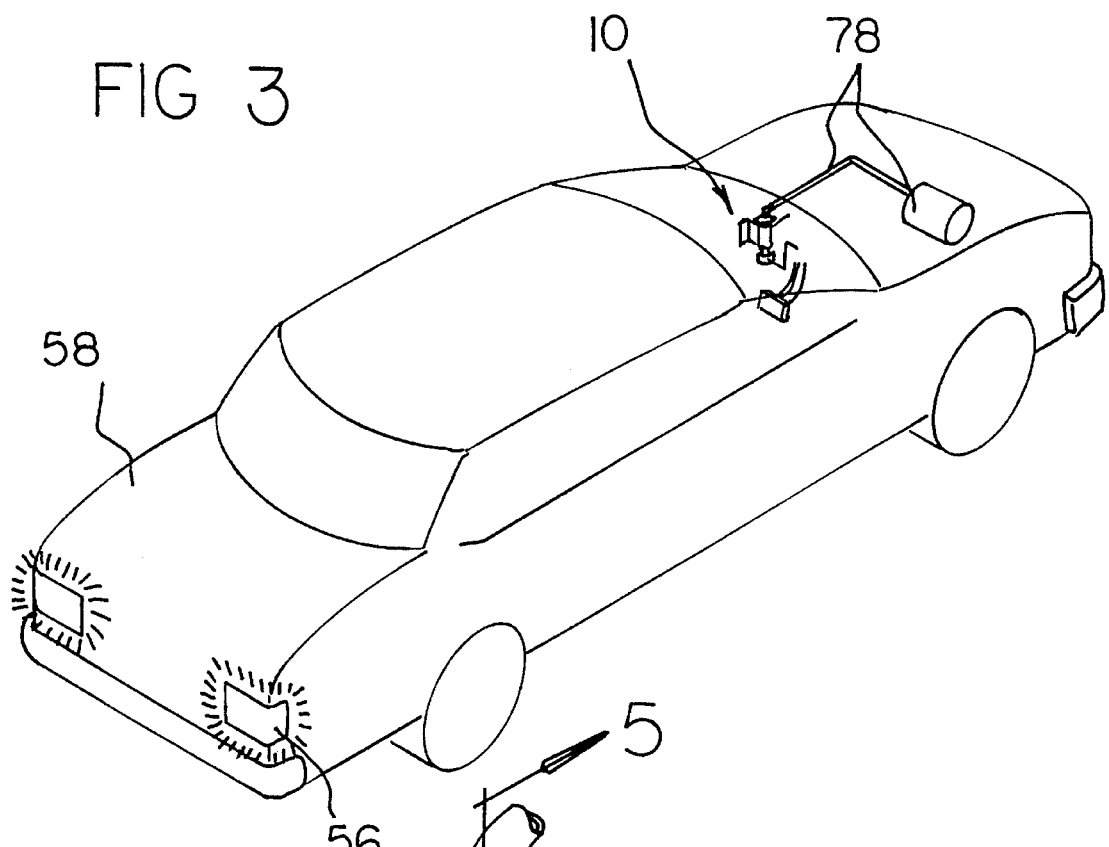
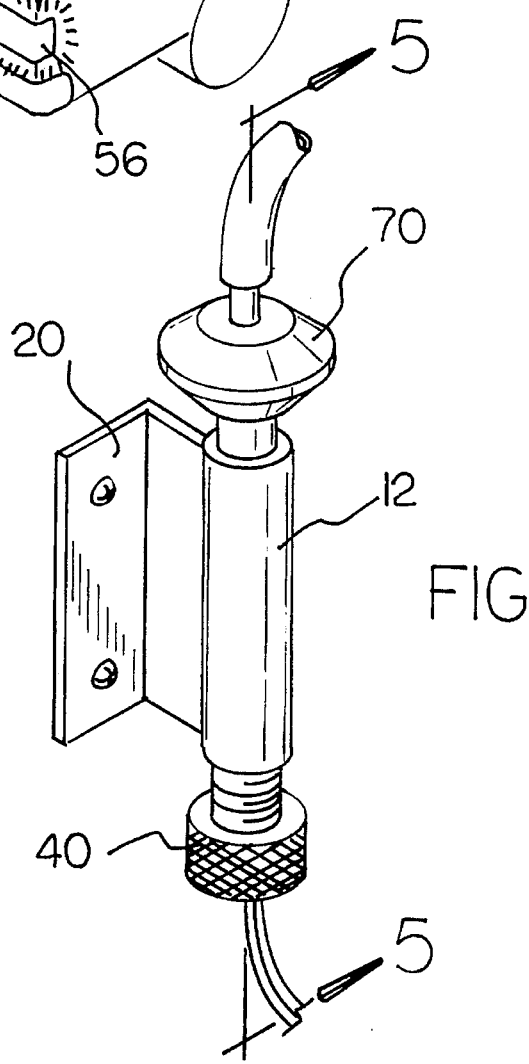

SECONDARY BRAKE LIGHT SWITCH

BACKGROUND OF THE INVENTION

1. Field of the Invention

The present invention relates to a secondary brake light switch and more particularly pertains to activating the brake lights of a vehicle when the vehicle is idling and de-activating the brake lights of a vehicle when the vehicle is accelerating with a secondary brake light switch.

2. Description of the Prior Art

The use of brake light switches is known in the prior art. More specifically, brake light switches heretofore devised and utilized for the purpose of controlling the activation or de-activation of the brake lights of a vehicle are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,921,750 to Shames discloses a vehicle brake warning light system accelerator pedal switch. U.S. Pat. No. 5,016,587 to Berger et al. discloses a brake stop light circuit arrangement for a vehicle having electronic diesel control. U.S. Pat. No. 5,023,599 to Mitchell et al. discloses a throttle position sensor advanced brake light device. U.S. Pat. No. 5,172,095 to Scott discloses a vehicle deceleration alert system. U.S Pat. No. 5,210,522 to Hoekman et al. discloses an early warning brake light actuated by the accelerator pedal.

While these devices fulfill their respective, particular objective and requirements, the aforementioned patents do not describe a secondary brake light switch that enables the brake lights of a vehicle to be de-energized when the vehicle is accelerating and enables the brake lights of a vehicle to be energized when the vehicle is idling.

In this respect, the secondary brake light switch according to the present invention substantially departs from the conventional concepts and designs of the prior art, and in doing so provides an apparatus primarily developed for the purpose of activating the brake lights of a vehicle when the vehicle is idling and de-activating the brake lights of a vehicle when the vehicle is accelerating.

Therefore, it can be appreciated that there exists a continuing need for new and improved secondary brake light switch which can be used for activating the brake lights of a vehicle when the vehicle is idling and de-activating the brake lights of a vehicle when the vehicle is accelerating. In this regard, the present invention substantially fulfills this need.

SUMMARY OF THE INVENTION

In the view of the foregoing disadvantages inherent in the known types of brake light switches now present in the prior art, the present invention provides an improved secondary brake light switch. As such, the general purpose of the present invention, which will be described subsequently in greater detail, is to provide a new and improved secondary brake light switch and method which has all the advantages of the prior art and none of the disadvantages.

To attain this, the present invention essentially comprises, in combination, a rigid tube having a first end and a threaded second end. Coupling means are included and adapted for coupling the tube to a vehicle. A plunger is slidably disposed within the tube with the plunger having an electrically conductive plunging head positioned at a location near the second end of the tube and a rod extended from the plunging head and terminated at a tip end located remote from the first end of the tube. An essentially cylindrical bolt is included and has a head, a threaded portion extended from the head, and a channel axially disposed therethrough with the threaded portion coupled with the second end of the tube. A switch is included and has a terminal coupled within the channel of the bolt at the threaded portion thereof, a pair of electrically-conductive terminal heads extended from the terminal and facing the plunging head, and a pair of wires having a first pair of ends with each end of the first pair coupled to a separate terminal head and a second pair of ends extended through the channel and from the head of the bolt adapted to be coupled between brake lights of a vehicle and their associated power source. A vacuum valve is provided. The vacuum valve includes a hollow and rigid body having an opened first end and an opened second end axially aligned and oppositely extended from the body for allowing communication therethrough with the first end thereof disposed within the first end of the tube and the second end thereof adapted to be coupled to a vacuum system of a vehicle. The vacuum valve includes a flexible diaphragm extended across the body between the first end and second end thereof with the diaphragm actuated when a high vacuum condition is created at the second end of the body and the diaphragm de-actuated when a low vacuum condition is created at the second end of the body. Lastly, the vacuum valve includes an elongated and rigid seat having one coupled to the diaphragm and the other end coupled to the tip end of the rod of the plunger. A spring is disposed within the tube and positioned between the plunging head and the first end of the vacuum valve. When a low vacuum condition is created when a vehicle is idling, the plunging head is urged by the spring to make contact with the terminal heads of the switch for energizing brake lights of a vehicle. When a high vacuum condition is created when a vehicle is accelerating, the plunging head is actuated by the diaphragm to break contact with the terminal heads of the switch for de-energizing the brake lights of a vehicle.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved secondary brake light switch which has all the advantages of the prior art brake light switches and none of the disadvantages.

It is another object of the present invention to provide a new and improved secondary brake light switch which may be easily and efficiently manufactured and marketed.

It is a further object of the present invention to provide a new and improved secondary brake light switch which is of durable and reliable construction.

An even further object of the present invention is to provide a new and improved secondary brake light switch which is susceptible of a low cost of manufacture with regard to both materials and labor, and which accordingly is then susceptible of low prices of sale to the consuming public, thereby making such a secondary brake light switch economically available to the buying public.

Still yet another object of the present invention is to provide a new and improved secondary brake light switch which provides in the apparatuses and methods of the prior art some of the advantages thereof, while simultaneously overcoming some of the disadvantages normally associated therewith.

Even still another object of the present invention is to provide a new and improved secondary brake light switch for activating the brake lights of a vehicle when the vehicle is idling and de-activating the brake lights of a vehicle when the vehicle is accelerating.

Lastly, it is an object of the present invention to provide a new and improved secondary brake light switch comprising a hollow housing having a first end and a second end; an electrically conductive plunger slidably disposed within the housing; a switch coupled to the second end of the housing with switch having an electrically conductive input terminal facing the plunger and an electrically conductive output terminal adapted to be coupled between brake lights of a vehicle and their associated power source; a generally hollow vacuum valve having a first end coupled to first end of the housing, a second end adapted to be coupled to a vacuum system of a vehicle, and a diaphragm disposed within the vacuum valve with the diaphragm actuated when a high vacuum condition is created at the second end of the housing when a vehicle is accelerating and the diaphragm de-actuated when a low vacuum condition is created at the second end of the housing when a vehicle is idling; and extension means coupled between the diaphragm of the valve and the plunger for allowing the plunger to contact the input terminal of the switch when the diaphragm is de-actuated, whereby enabling brake lights of a vehicle to be energized, and allowing the plunger to break contact with the input terminal of the switch when the diaphragm is actuated, whereby enabling brake lights of a vehicle to be de-energized.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective view of the preferred embodiment constructed in accordance with the principles of the present invention coupled with a brake system of a vehicle.

FIG. 4 is an enlarged perspective view of the preferred embodiment constructed in accordance with the principles of the present invention.

The same reference numerals refer to the same parts through the various Figures.

DESCRIPTION OF THE PREFERRED EMBODIMENT

Figure 1:
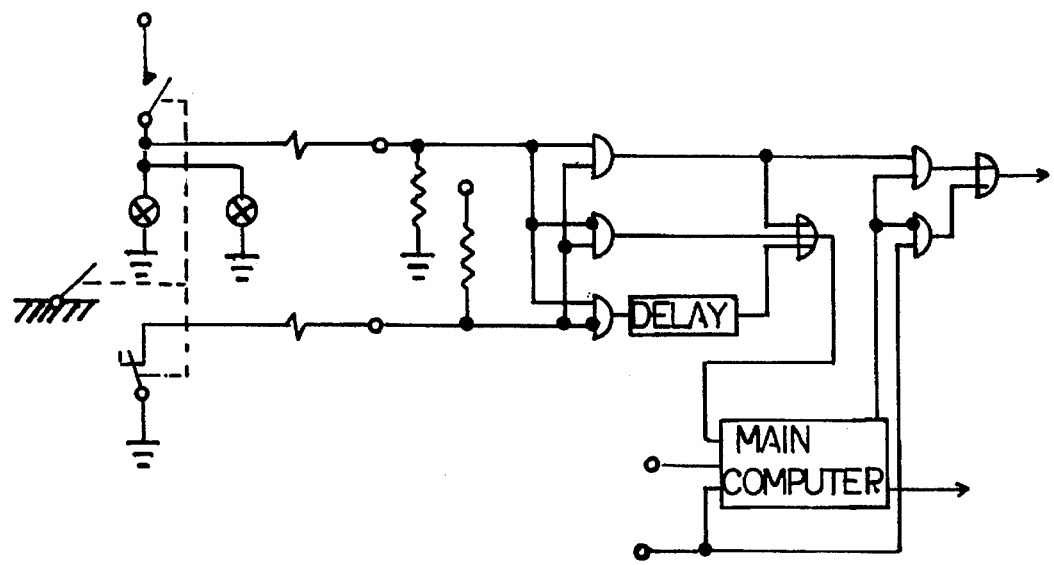
FIG. 1 is a schematic view of a prior art brake stop light circuit arrangement for a vehicle having electronic diesel control.
Figure 2:
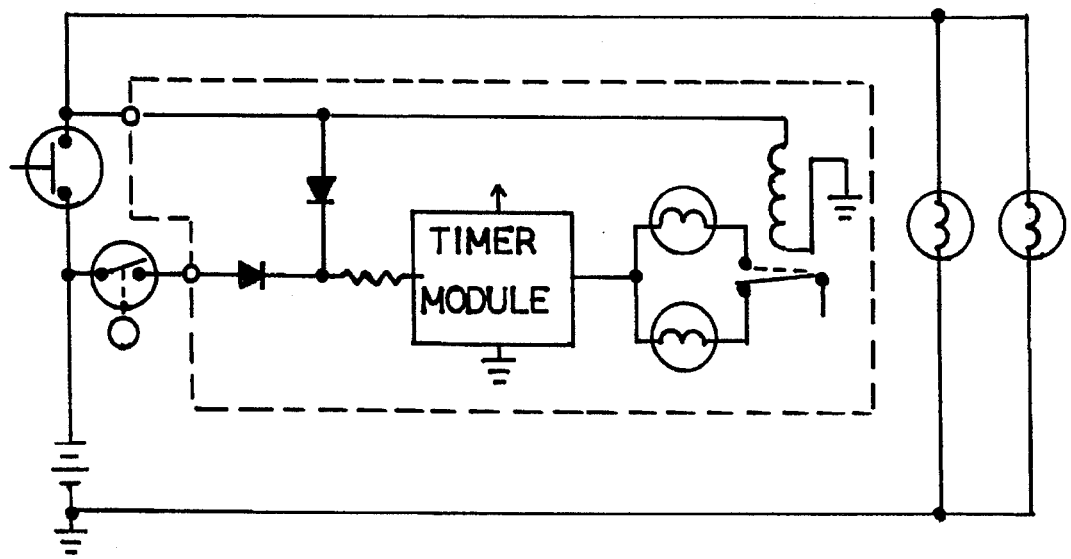
FIG. 2 is a schematic view of a prior art vehicle deceleration alert system.
Figure 5:
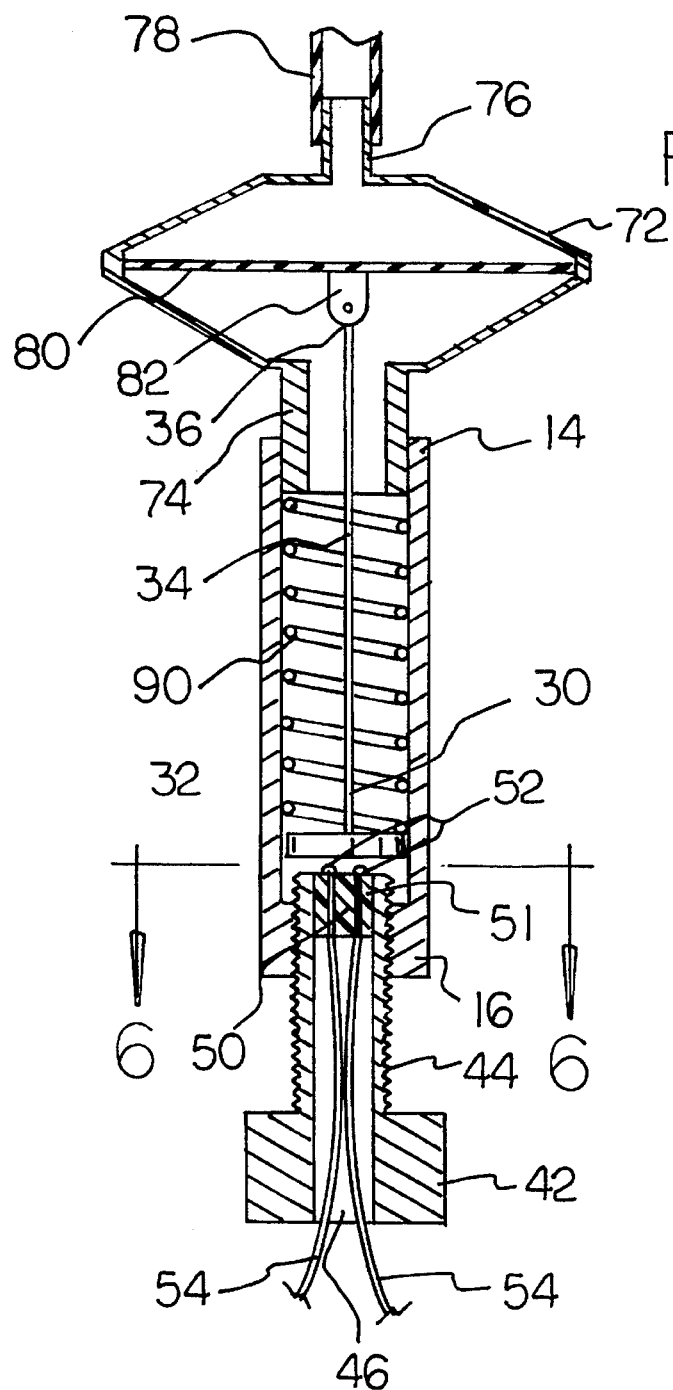
FIG. 5 is a cross-sectional view of the present invention taken along the line 5—5 of FIG. 4.
Figure 6:
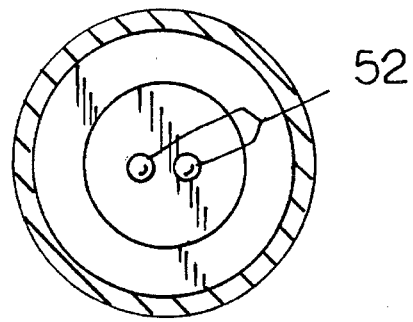
FIG. 6 is a cross-sectional view depicting the terminal heads of the terminal taken along the line 6—6 of FIG. 5.

With reference now to the drawings, and in particular, to FIG. 1 thereof, the preferred embodiment of the new and improved secondary brake light switch embodying the principles and concepts of the present invention and generally designated by the reference number 10 will be described.

Specifically, the present invention includes seven major components. The major components are the tube, coupling means, plunger, bolt, switch, vacuum valve, and spring. These components are interrelated to provide the intended function.

More specifically, it will be noted in the various Figures that the first major component is the tube 12. The tube is rigid and elongated in structure. It has a first end 14 and a threaded second end 16. The tube serves as the guiding mechanism for allowing operation of the present invention.

The second major component is the coupling means 20. The coupling means is adapted for coupling the tube to a vehicle. The coupling means may be formed in a variety of configurations adapted for different types of vehicles. For example, an L-shaped bracket may be utilized. The L-shaped bracket will have one cross leg coupled to the tube and another cross leg extended therefrom. Screws are disposed through the extended cross leg and adapted to be coupled to an engine compartment of a vehicle. Essentially, the coupling means secures the present invention at a location for preventing inadvertent movement thereof.

The third major component is the plunger 30. The plunger is rigid in structure. It is slidably disposed within the tube 12. The plunger has an electrically conductive plunging head 32. This plunging head is essentially cylindrical in structure and is adapted to slide within the interior of the tube. The plunging head is positioned at a location near the second end 16 of the tube. A rod 34 is extended from the plunging head along the central axis of the tube. It is terminated at a tip end 36 at a position remote from the first end 14 of the tube. The plunger is adapted to move inwards and outwards through the tube when a forward or rearward plunging force is applied to the tip end thereof.

The fourth major component is the bolt 40. The bolt is rigid and essentially cylindrical in structure. The bolt has a head 42 and a threaded portion 44 extended from the head. The head also has a knurled peripheral surface for allowing a user a firm grip. A channel 46 is axially disposed through the bolt. The threaded portion of the bolt is coupled with the second end 16 of the tube. The extent of the threaded portion within the tube may be adjusted by loosening or tightening the bolt through the application of torquing force on the head. The bolt essentially limits the extent to which the plunger can move towards the second end of the tube.

The fifth major component is the switch 50. The switch has a terminal 51 coupled within the channel 46 of the bolt. This terminal is plug-shaped and positioned near the end of the threaded portion 44 of the bolt. The terminal is essentially formed of a non-conductive elastomeric material. A pair of electrically-conductive terminal heads 52 are extended from the terminal and facing the plunging head 32. A pair of wires 54 are also included as part of the switch. The pair of wires have a first pair of ends. Each end of the first pair is coupled to a separate terminal head 52. The pair of wires also have a second pair of ends extended through the channel and from the head 42 of the bolt. The second pair of ends are adapted to be coupled between the brake lights 56 of a vehicle 58 and their associated power source 60.

The sixth major component is the vacuum valve 70. The vacuum valve includes three subcomponents. The subcomponents are the body, diaphragm, and seat. These subcomponents are interrelated to provide the intended function.

The first subcomponent of the vacuum valve is the body 72. The body is hollow and rigid in structure. It has an opened first end 74 and an opened second end 76. The opened first end and opened second end are axially aligned and oppositely extended from the body. The opened first end and the opened second end allow communication through the body. The first end of the body is disposed within the first end 14 of the tube. The second end 76 of the body is adapted to be coupled to a vacuum system 78 of a vehicle.

The second subcomponent of the vacuum valve is the diaphragm 80. The diaphragm is flexible in structure and formed of a sheet of elastomeric material. It is extended fully across the body between the first end 74 and the second end 76 thereof. The diaphragm is adapted to be actuated when a high vacuum condition is created at the second end of the body. This high vacuum condition causes the diaphragm to be pulled toward the second end of the body. The diaphragm is de-actuated when a low vacuum condition is created at the second end of the body. When the low vacuum condition is created, the diaphragm assumes a generally planar rest position within the body. Thus, the body of the vacuum valve is essentially used to contain and direct vacuum forces from a vacuum system of a vehicle upon the diaphragm.

The third subcomponent of the vacuum valve is the seat 82. The seat is elongated and rigid in structure. It has one end coupled to the diaphragm 80. The other end of the seat is coupled to the tip end 36 of the rod of the plunger. The seat thus transfers plunging forces generated by the actuation or de-actuation of the diaphragm to the plunger.

The seventh major component is the spring 90. The spring is disposed within the tube 12. It is positioned between the plunging head 32 and the first end 74 of the vacuum valve. The spring is adapted to urge the plunging head towards the switch to make contact with the terminal heads 52. In order to achieve this contact, the bolt may be threadably adjusted, preferably when the vehicle is idling.

Now, when a low vacuum condition is created when a vehicle is idling, the plunging head is urged by the spring 90 to make contact with the terminal heads 52 of the switch. This de-actuated condition closes the switch and energizes the brake lights of a vehicle. Conversely, when a high vacuum condition is created when a vehicle is accelerating, the plunging head 32 is actuated by the diaphragm 80 to break contact with the terminal heads 52 of the switch. This actuated condition de-energizes the brake lights 56 of a vehicle.

Figure 7:
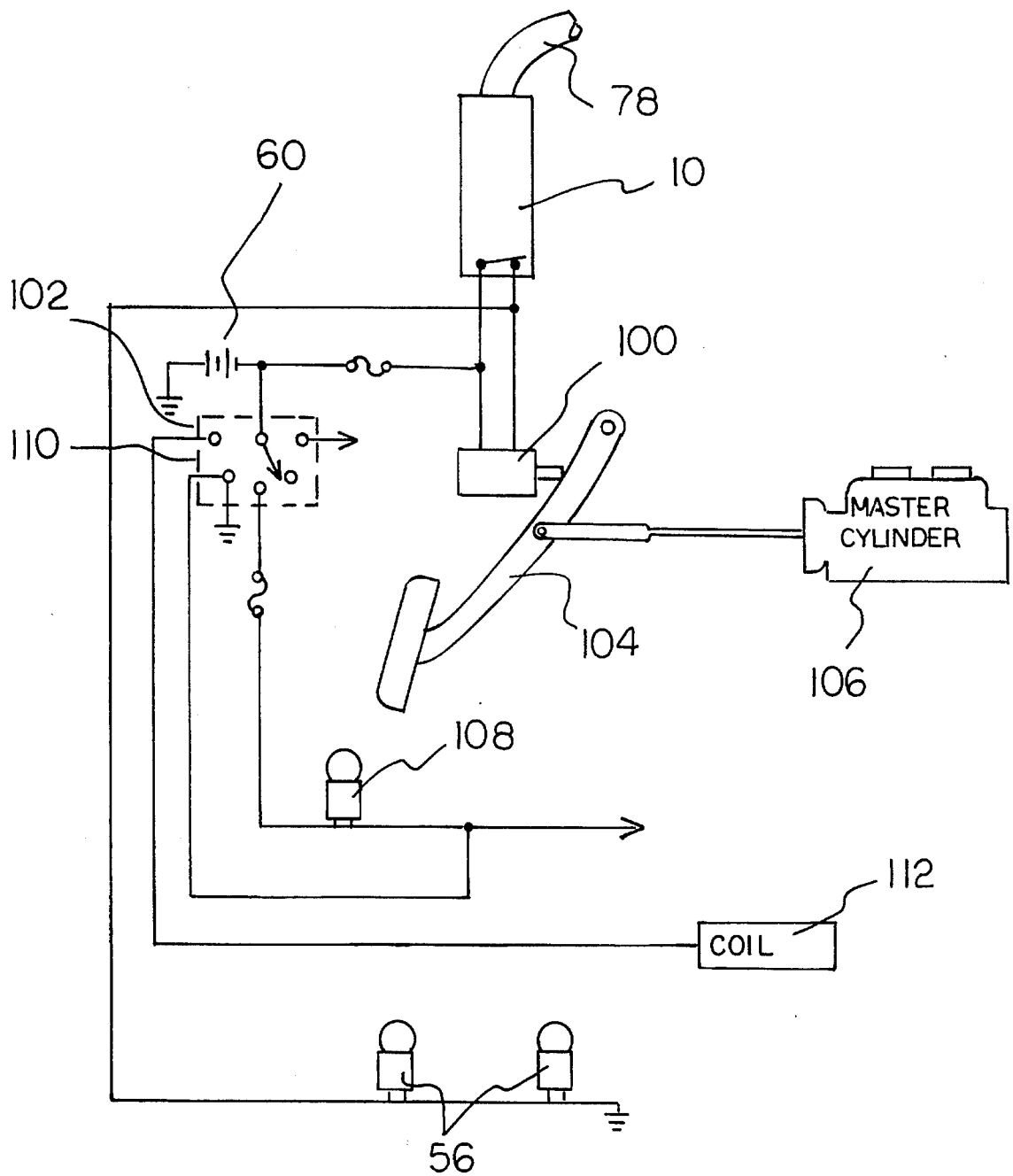
FIG. 7 is a schematic view of the present invention coupled with a brake system of a vehicle.

A typical schematic diagram depicting the coupling of the present invention with components of the electrical, mechanical, and vacuuming systems of a vehicle are shown in FIG. 7. The present invention is coupled between the brake lights 56, battery 60, and brake light switch 100 of the electrical system of a vehicle. The conventional brake light switch 100 of a vehicle works in conjunction with the present invention and is actuated through the brake pedal 104. The brake pedal operates in conjunction with a master cylinder 106 of a vehicle for generating compressive forces for allowing operation of the brakes of a vehicle. Supplementary dash lights 108 resident in the drivers compartment of the vehicle are also included as part of the electrical system of the brakes. An ignition switch 110 is used to activate the vehicle through a coil 112 and, in turn, control the vacuuming forces generated by the vacuuming system 78 of the vehicle. The vacuuming system is also coupled with the present invention. The vacuuming forces from the vacuuming system are used as an input for actuating the present invention. In this configuration, the present invention works in association with the electrical, mechanical, and vacuuming systems of a vehicle for controlling the illumination of the brake lights and supplementary dash lights.

Bad driving habits are a common problem witnessed by almost everyone who drives an automobile. One of these bad habits is taking the foot off the brake pedal when stopped and standing still in manual transmission vehicles, and when moving very slowly primarily in automatic transmission vehicles. What this does is extinguish the brake lights, which provide a warning signal to other drivers approaching from behind. The present invention is designed to help compensate for this habit by keeping the brake lights on until the vehicle accelerates. It is a fail-safe device that overrides human error and provides a warning signal that the vehicle in which it is installed is not moving or barely moving.

The present invention is a normally closed spring-loaded vacuum actuated single pole switch that is connected in parallel with the regular pedal-actuated brake light switch. The switch is connected to an auxiliary terminal of the an ignition switch of the vehicle (see FIG. 7). The switch is also connected to the brake light wires. The switch is kept closed by an adjustable spring-loaded diaphragm. A rubber or plastic hose connects the vacuum side of the diaphragm to the vacuum manifold on the engine. When electrical power is applied via an ignition switch, the switch will turn the brake lights on and keep them on until the engine is started and is running above idle speed. Since various engine types produce different amounts of vacuum at different speeds, the spring can be adjusted so that the switch opens when the engine speed is above its fastest idle. This has the effect of turning on the brake lights when taking the foot off the accelerator to coast or slow down. The present invention would thus maintain brake light integrity until forward motion has been resumed. The present invention would be most effective on standard transmission vehicles.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A secondary brake light switch for activating the brake lights of a vehicle when the vehicle is idling and de-activating the brake lights of the vehicle when the vehicle is accelerating comprising, in combination:

a rigid tube having a first end and a threaded second end;

coupling means adapted for coupling the tube to the vehicle;

a plunger slidably disposed within the tube with the plunger having an electrically conductive plunging head positioned at a location near the second end of the tube and a rod extended from the plunging head and terminated at a tip end located remote from the first end of the tube;

an essentially cylindrical bolt having a head, a threaded portion extended from the head, and a channel axially disposed therethrough with the threaded portion removably coupled with the second end of the tube;

an openable switch having a terminal coupled within the channel of the bolt at the threaded portion thereof, a pair of electrically-conductive terminal heads extended from the terminal and facing the plunging head and with the bolt threadedly adjusted within the tube to place the switch in an opened position with the heads thereof offset from the plunging head when an engine of the vehicle running at its fastest idling speed, and a pair of wires having a first pair of ends with each end of the first pair coupled to a separate terminal head and a second pair of ends extended through the channel and from the head of the bolt adapted to be coupled between brake lights of a vehicle and their associated power source;

a vacuum valve further comprising:

a hollow and rigid body having an opened first end and an opened second end axially aligned and oppositely extended therefrom for allowing communication therethrough with the first end thereof disposed within the first end of the tube and the second end thereof adapted to be coupled to the vacuum system of the vehicle;

a flexible diaphragm extended across the body between the first end and second end thereof with the diaphragm being actuated when a high vacuum condition is created at the second end of the body and the diaphragm being de-actuated when a low vacuum condition is created at the second end of the body; and an elongated and rigid seat having one end coupled to the diaphragm and the other end coupled to the tip end of the rod of the plunger; and a spring disposed within the tube and positioned between the plunging head and the first end of the vacuum valve;

whereby when the low vacuum condition is created when the vehicle is idling, the plunging head is urged by the spring to make contact with the terminal heads of the switch for energizing the brake lights of the vehicle, and when the high vacuum condition is created when the vehicle is accelerating, the plunging head is actuated by the diaphragm to break contact with the terminal heads of the switch for de-energizing the brake lights of the vehicle.

* * * * *